(12) United States Patent
Endo et al.

(10) Patent No.: US 7,878,570 B2
(45) Date of Patent: *Feb. 1, 2011

(54) PASSENGER'S WEIGHT MEASUREMENT DEVICE FOR VEHICLE SEAT

(75) Inventors: Shigeru Endo, Shioya-gun (JP); Kenji Sato, Shioya-gun (JP)

(73) Assignee: TS Tech Co., Ltd., Asaka (JP)

( * ) Notice: Subject to any disclaimer, the term of this patent is extended or adjusted under 35 U.S.C. 154(b) by 932 days.

This patent is subject to a terminal disclaimer.

(21) Appl. No.: 11/632,351

(22) PCT Filed: Jul. 29, 2005

(86) PCT No.: PCT/JP2005/013943

§ 371 (c)(1),
(2), (4) Date: Jan. 12, 2007

(87) PCT Pub. No.: WO2006/011597

PCT Pub. Date: Feb. 2, 2006

(65) Prior Publication Data
US 2008/0084086 A1 Apr. 10, 2008

(30) Foreign Application Priority Data
Jul. 30, 2004 (JP) ............................. 2004-223421

(51) Int. Cl.
*B60N 2/44* (2006.01)
(52) U.S. Cl. .................. 296/68.1; 296/65.13; 248/424

(58) Field of Classification Search ................. 248/424, 248/429; 296/68.1, 65.13; 180/273; 280/735; 177/136, 144
See application file for complete search history.

(56) References Cited

U.S. PATENT DOCUMENTS 6,356,200 B1    3/2002   Hamada et al.
7,614,680 B2 *  11/2009  Endo et al. ................ 296/68.1

FOREIGN PATENT DOCUMENTS

| JP | A 10-297334 | 11/1998 |
| JP | A 11-304579 | 11/1999 |
| JP | A 2000-203324 | 7/2000 |
| JP | A 2003-96855 | 4/2003 |

* cited by examiner

*Primary Examiner*—Gwendolyn Baxter
(74) *Attorney, Agent, or Firm*—Oliff & Berridge, PLC

(57) ABSTRACT

A passenger weight measurement device for a vehicle seat which can be assembled to prevent the occurrence of the initial deformation and the initial load. The passenger weight measurement device 1 comprising a pair of left and right fixed lower rails 3 fixed on the floor of a vehicle, a pair of movable upper rails 4 disposed to be movable in a front-and-rear direction on each of the fixed lower rails 3, load sensors 50 and 60 fixed on an upper surface of the left movable upper rail 4, load sensors 70 and 80 mounted on the movable upper rail 4 to be movable in a left-and-right direction with respect to the right movable upper rail 4, and a rectangular frame 110 mounted on the load sensors 50, 60, 70, and 80.

24 Claims, 7 Drawing Sheets

PASSENGER'S WEIGHT MEASUREMENT DEVICE FOR VEHICLE SEAT

TECHNICAL FIELD

The present invention relates to a passenger's weight measurement device for a vehicle seat which measures a weight of a passenger who sits on a vehicle seat.

BACKGROUND ART

Recently, to improve performance of various safety devices such as a seat belt and an air bag, operations of the safety devices have been controlled in accordance with a weight of a passenger sitting on a vehicle seat in some cases. In the conventional passenger's weight measurement device for measuring a weight of a seated passenger, a load sensor is disposed between a vehicle floor and the vehicle seat (For example, refer to Patent Document 1 and Patent Document 2).

Patent Document 1:Japanese Patent Document 10-297334
Patent Document 2:Japanese Patent Document 11-304579

DISCLOSURE OF THE INVENTION

Problem to be Solved by the Invention

Generally, in a vehicle seat, it is often the case that a slide rail is disposed between a cushion frame and a floor, and a vehicle seat is to move in a front-and-rear direction by the slide rail. Therefore, because a load transmitted to a load sensor varies according to the position of the vehicle in a front-and-rear direction, the load variability according to a front-and-rear position of the vehicle needs to be considered in order to improve the accuracy of the passenger's weight measurement. Although it is not a publicly know invention, the load sensor is disposed between the slide rail and the cushion frame, and the applicant of the present application filed a patent application related to such an invention (JP Application No. 2003-096855). According to such an invention, the load which is transmitted to the load sensor can be always held constant regardless of front-and-rear position of the vehicle seat by moving the load sensor in a front-and-rear direction in unity with the vehicle seat and the slide rail.

However, in case that the positional relation between the cushion frame and the load sensor, the positional relation between the load sensor and the slide rail, and the configuration of the cushion frame and the like are not accurate as they are designed, an initial deformation and an initial load may occur when assembling the load sensor, the cushion, and the slide rail to each other. Thus, there is a potential risk that the passenger's weight cannot be measured accurately.

An object of the present invention is to provide a passenger's weight measurement device for a vehicle seat which can be assembled to suppress the initial deformation and the initial load.

Means for Solving the Problem

To solve the aforementioned problem, a passenger's weight measurement device for a vehicle seat comprises a pair of left and right movable rails which are disposed to be movable in a front-and-rear direction on each of a pair of left and right fixed rails fixed on a vehicle side, a plurality of load sensors which are mounted on the pair of movable rails and which comprises rods extending above, a rectangular frame which is disposed on an upper side of the pair of movable rails and in which a plurality of mounting holes corresponding to the plurality of load sensors are formed to penetrate in an up and down direction, and the rectangular frame in which the rods of the plurality of load sensors are inserted into the plurality of mounting holes from bottom up, is mounted on the plurality of load sensors.

As described above, because the rods of the load sensors are inserted from bottom up into the mounting holes which are formed on the pre-assembled rectangular frame and the rectangular frame is mounted on the load sensors, the initial deformation and the initial load can be suppressed more as compared with the case where the parts of the rectangular frame are mounted on the load sensor and then the rectangular frame are framed by assembling the parts.

In the present invention, it is preferred that nuts are engaged with the plurality of rods and the rods are fixed to the rectangular frame by tightening of the nuts.

In the present invention, it is preferred that one load sensor of the plurality of load sensors is mounted on one movable rail of the pair of movable rails in a state that the one load sensor is fixed to the one movable rail, and another load sensor of the plurality of load sensors is mounted on the other movable rail of the pair of movable rails so as to move in a left-and-right direction with respect to the other movable rail.

As described above, one of the load sensor is fixed to one of the movable rail. Another load sensor is movable in a left-and-right direction with respect to the other movable upper rail. Therefore, when the rectangular frame is mounted on the load sensors, rods of the load sensors can be matched to each of the mounting holes respectively by adjusting the position of another load sensor. Thus, the initial deformation and the initial load can be suppressed.

In the present invention, it is preferred that the passenger's weight measurement device for the vehicle seat further comprises a bridging member which is provided between the pair of fixed rails.

As described above, because a bridging member is provided between a pair of fixed rails, the variable of a space between a pair of fixed rails can be suppressed.

EFFECT OF THE INVENTION

According to the present invention, the initial deformation and the initial load which occur to the rectangular frame and the fixed rail can be suppressed. Therefore, the accuracy of the passenger's weight measurement by the load sensor is improved.

BEST MODE FOR CARRYING OUT THE INVENTION

Figure 1:
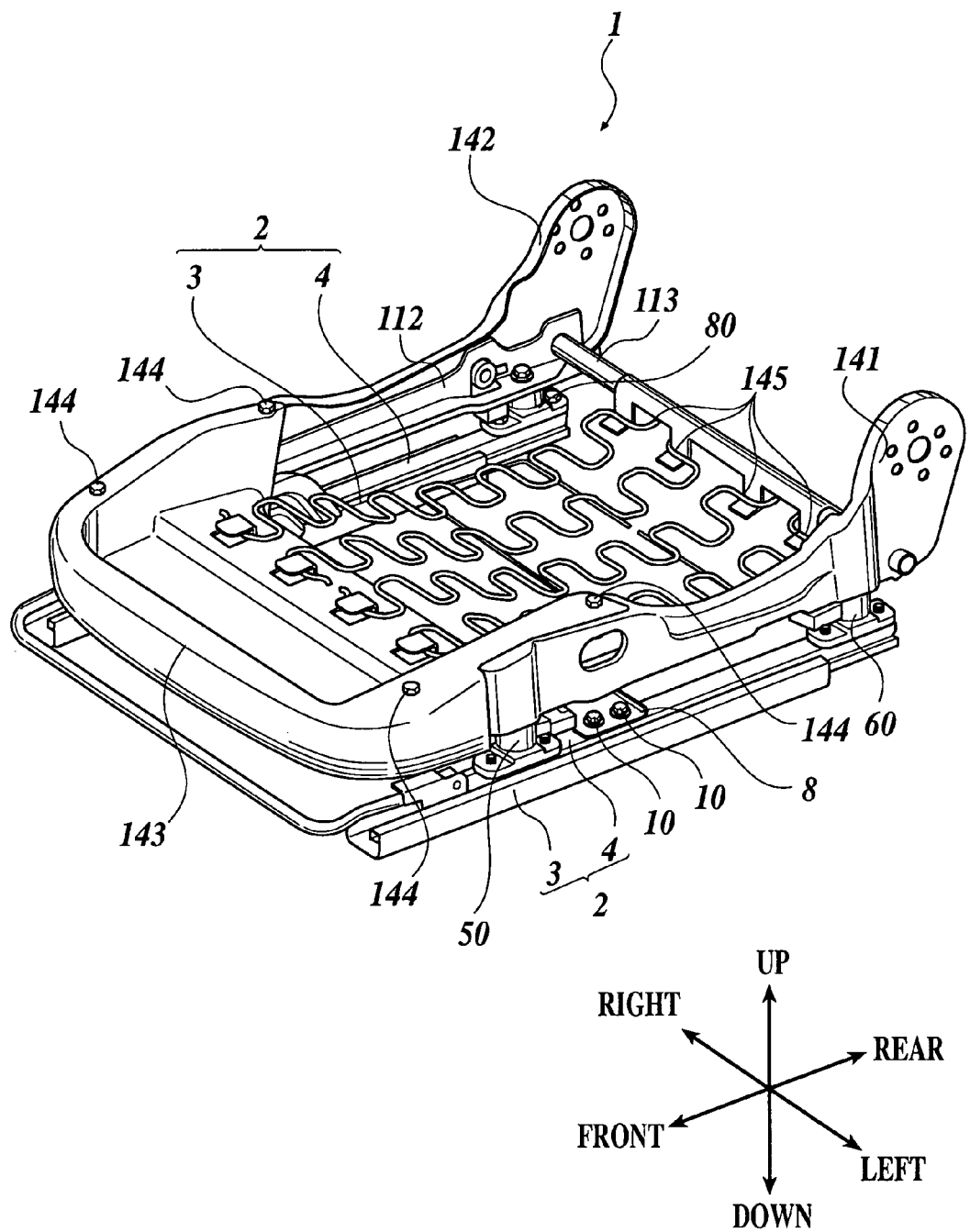
FIG. 1 This is a perspective view showing a passenger's weight measurement device 1 for a vehicle seat.

The preferred embodiments of the present invention will be described below with reference to the accompanying drawings. In the embodiments below, various technical preferable limitations are added to carry out the invention. However, the scope of the invention is not limited to the embodiments described below and the examples shown in the drawings.

Figure 2:
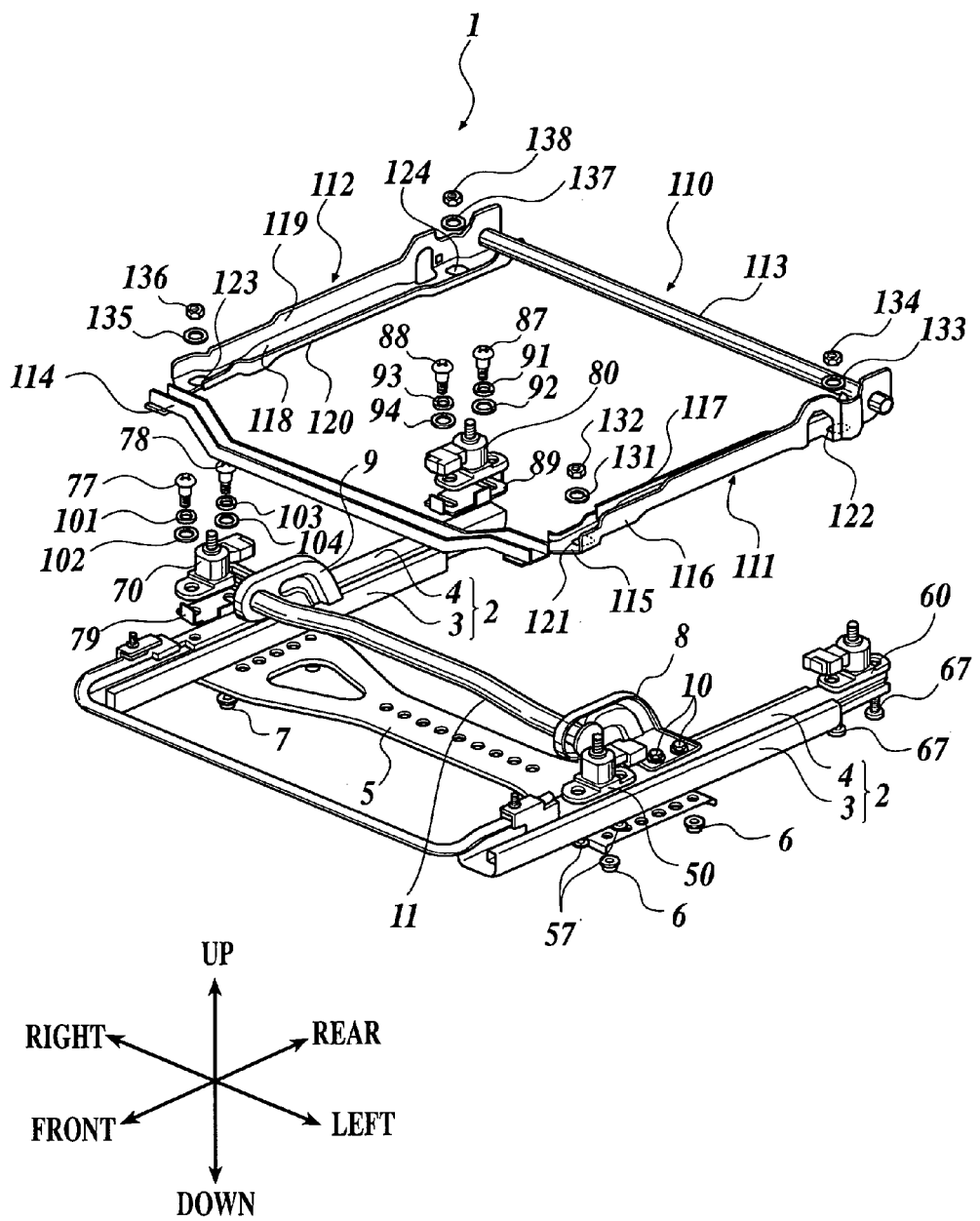
FIG. 2 This is an exploded perspective view showing a passenger's weight measurement device 1.

FIG. 1 is a perspective view showing a passenger's weight measurement device 1 for a vehicle seat, and FIG. 2 is an exploded perspective view showing a passenger's weight measurement device 1. In each of the drawings, arrows indicating up-and-down, left-and-right, and front-and-rear correspond to the directions as seen from a passenger seated on the vehicle seat.

The passenger's weight measurement device 1 is mounted on the bottom of a seat cushion which a passenger sits on. Further, the passenger's weight measurement device 1 is for the right side seat of the vehicle seat. A buckle for a seatbelt is provided at the left side of the passenger's weight measurement device 1 and a tongue plate of the seatbelt is to be fastened by this buckle.

As shown in FIGS. 1 and 2, a pair of left and right seat-sliders 2 parallel to each other are disposed on the floor of the passenger compartment. Both of the seat-sliders 2 comprise a fixed lower rail 3 which extends in a front-and-rear direction of the vehicle and is fixed to the floor of the passenger compartment, and a movable upper rail 4 which is engaged with the fixed lower rail 3 to be slidable in a front-and-rear direction on the fixed lower rail 3 with respect to the fixed lower rail 3.

The left end of a lower bracket 5 as a bridging member is fixed to a lower surface of the left fixed lower rail 3 by a bolt and nut connection 6, and the right end of a lower bracket 5 is fixed to a lower surface of the right fixed lower rail 3 by a bolt and nut connection 7. The lower bracket 5 is crossed over the left and the right fixed lower rail 3 and improves the rigidity to suppress the variable of the space between the left and the right fixed lower rails 3.

The bracket 8 is fixed to the middle portion of the left movable upper rail 4 in a front-and-rear direction on an upper surface thereof by a bolt and nut connection 10, and the bracket 9 is fixed to the middle portion of the right movable upper rail 4 in a front-and-rear direction on an upper surface thereof by a bolt and nut connection. Both brackets 8 and 9 are formed in L-shape when seen from the front and are disposed so as to erect them on the upper surface of the movable upper rail 4, respectively.

Figure 3A:
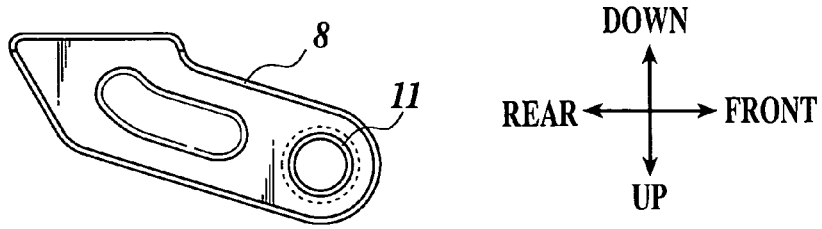
FIG. 3A This is a side view showing an attachment structure of a submarine pipe 11.
Figure 3B:
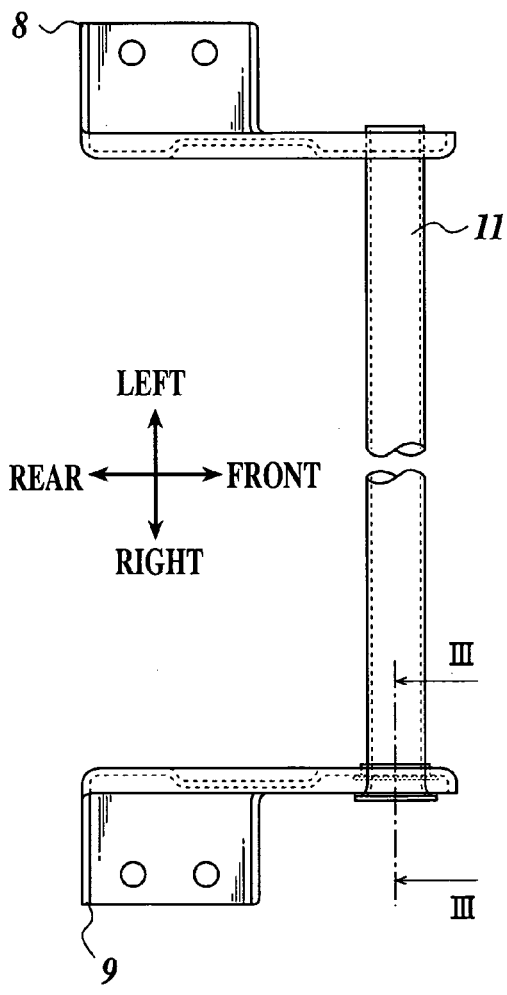
FIG. 3B This is a plan view showing an attachment structure of a submarine pipe 11.
Figure 3C:
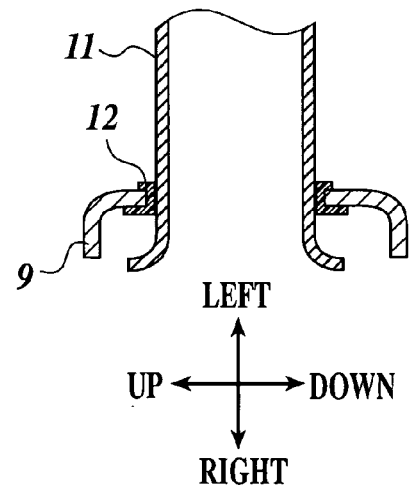
FIG. 3C This is a schematic sectional diagram cut along the line of FIG. 3B.

Between the brackets 8 and 9, a submarine pipe 11 is installed. Here, the brackets 8 and 9 and the submarine pipe 11 will be described in detail with reference to FIGS. 3A to 3C. FIG. 3A is a left side view, FIG. 3B is a top view, and FIG. 3C is a schematic sectional diagram cut along the line III-III of FIG. 3B.

A mounting hole which penetrates in a left-and-right direction is formed on the left bracket 8 and the left end of the submarine pipe 11 is inserted into the mounting hole. Further, the bracket 8 and the submarine pipe 11 are fixed by welding.

A mounting hole which penetrates in a left-and-right direction is also formed on the right bracket 9 and the ring-shaped nylon bush 12 is fitted in the mounting hole. The bush 12 is latched by the bracket 9 along the edge of the mounting hole, and the moving of the bush 12 in the penetration direction of the mounting hole is deterred. The right end of the submarine pipe 11 is inserted into the bush 12, and the submarine pipe 11 can slide in the penetration direction of the mounting hole with respect to the bush 12. Moreover, the sectional area of the submarine pipe 11 at a predetermined distance apart towards the right end of the submarine pipe 11 from the mounting hole of the bracket 9 (here, the area at the right end) is formed to be larger than the area of the mounting hole. Particularly, the submarine pipe 11 is provided in a shape where the opening of the submarine pipe 11 becomes larger as it approaches the right end in the right side of the mounting hole of the bracket 9 (trumpet shape) to prevent the submarine pipe 11 from falling out from the bush 12 and the mounting hole. By providing a flange at the right end of the submarine pipe 11, the sectional area of the submarine pipe 11 including the flange can be made larger than the mounting hole, and the submarine pipe 11 may be prevented from falling out from the bush 12 and the mounting hole by the flange.

In the present embodiment, the submarine pipe 11 is fixed to the left bracket 8 and can slide in a left-and-right direction with respect to the right bracket 9. However, the submarine pipe 11 may slide in a left-and-right direction with respect to the left bracket 8 and may be fixed to the right bracket 9. Further, the submarine pipe 11 may slide in a left-and-right direction with respect to both left and right brackets 8 and 9.

As shown in FIGS. 1 and 2, a load sensor 50 is mounted on the front end of the upper surface of the left movable upper rail 4, and a load sensor 60 is mounted on the rear end of the upper surface of the left movable upper rail 4. The load sensors 50 and 60 detect the load as an electrical signal.

Figure 4:
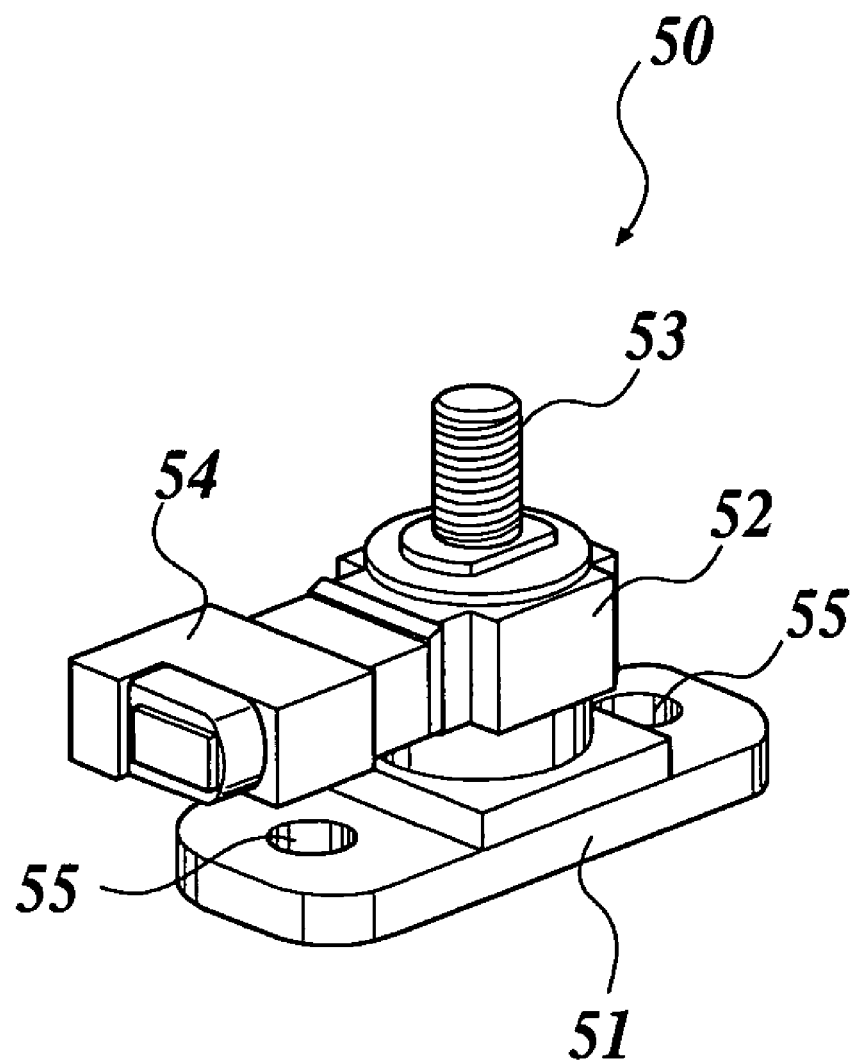
FIG. 4 This is a perspective view showing a left load sensor 50.

The left front load sensor 50 will be described with reference to FIG. 4. FIG. 4 is a perspective view showing the left front load sensor 50. As shown in FIG. 4, the left front load sensor 50 comprises a column-shaped sensing unit 52 which detects the load, a plate-like flange 51 which horizontally extends in a front direction and in a rear direction from the bottom end of the sensing unit 52, a load input rod 53 which extends upward from an upper end of the sensing unit 52, and a connector 54 which extends from the sensing unit 52 to become horizontal with the flange 51. At the front and the rear of the flange 51, male screw shaped circular holes 55 which penetrate in an up-and-down direction are formed respectively, and one of the circular holes 55 is located directly beneath the connector 54. A screw thread is formed on the periphery of the load input rod 53. Moreover, the sensing unit 52 incorporates a strain gauge, and the load is converted to an electrical signal by the strain gauge.

Figure 5:
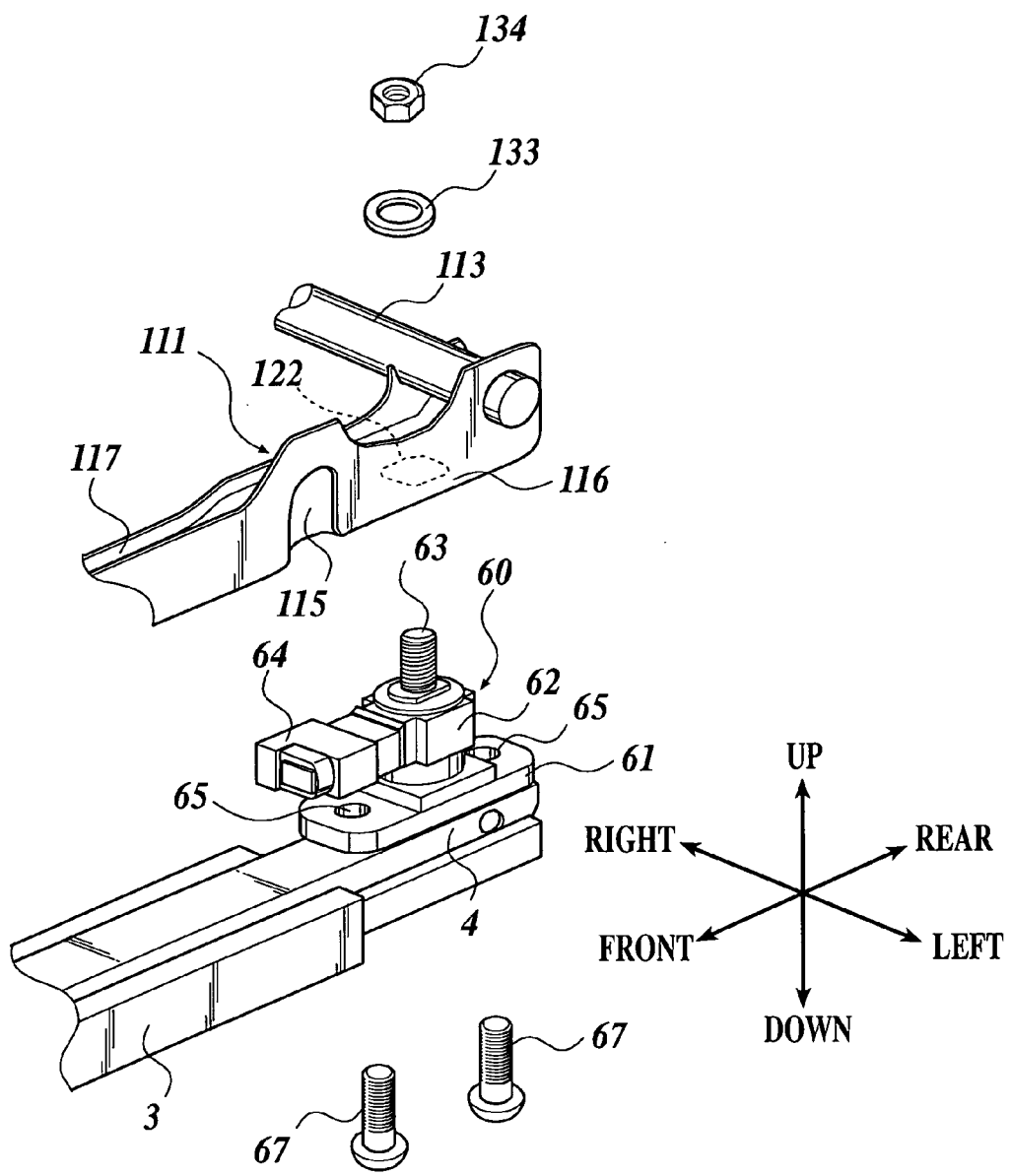
FIG. 5 This is an exploded perspective view showing an attachment structure of a load sensor 60.

FIG. 5 is an exploded perspective view showing a rear end of the left movable upper rail 4. As shown in FIG. 5, similar to the left front load sensor 50, the left rear load sensor 60 comprises a flange 61, a sensing unit 62, a load input rod 63, and a connector 64. References having the same last single digit are assigned to the corresponding parts of the left front load sensor 50 and the left rear load sensor 60, and the description for each part of the left rear load sensor 60 is omitted.

The left rear load sensor 60 is disposed on the rear end of the left movable upper rail 4 as shown in FIG. 5. The lower surface of the flange 61 abuts the upper surface of the left movable upper rail 4, and the male screws 67 and 67 which penetrate the movable upper rail 4 from bottom up engage with the circular holes 65 and 65. By the tightening of the male screws 67 and 67, the movable upper rail 4 is held between the heads of the male screws 67 and 67 and the flange 61. In such way, the load sensor 60 is fixed to the upper surface of the movable upper rail 4. On the other hand, as shown in FIGS. 1 and 2, similar to the case of the load sensor 60, the left front load sensor 50 is fixed to the front upper surface of the movable upper rail 4 by engaging the male screws 57 and 57 which penetrates the movable upper rail 4 from bottom up with the circular holes 55 and 55. Here, the tip of the connector 54 is directed backward for the left front load sensor 50, while the tip of the connector 64 is directed forward for the left rear load sensor 60.

As shown in FIG. 2, a load sensor 70 is mounted on the front end of the upper surface of the right movable upper rail 4, and a load sensor 80 is mounted on the rear end of the upper surface of the right movable upper rail 4. The load sensors 70 and 80 are provided to detect the load as an electrical signal.

Figure 6:
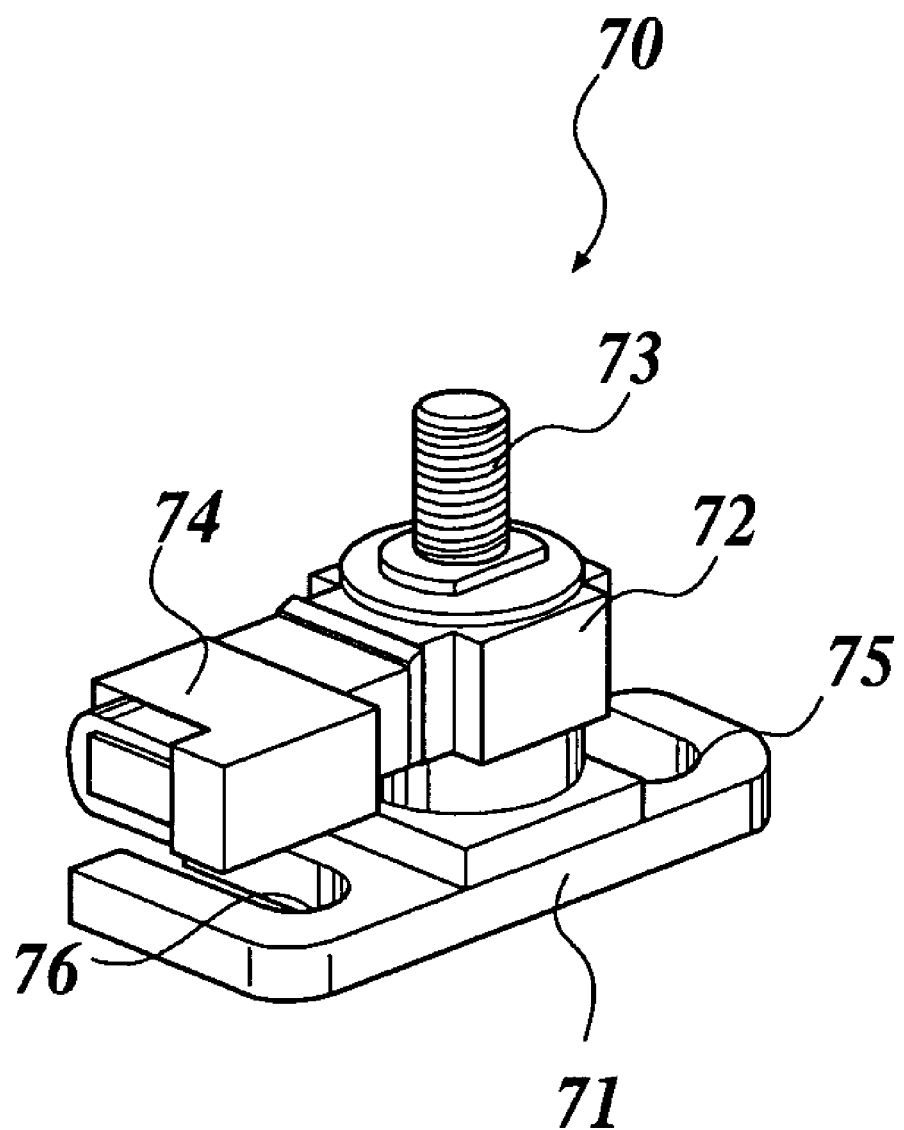
FIG. 6 This is a perspective view showing a right load sensor 70.

The right front load sensor 70 will be described with reference to FIG. 6. FIG. 6 is the perspective view showing the right front load sensor 70. As shown in FIG. 6, the right front load sensor 70 comprises a column-shaped sensing unit 72 which detects the load, a plate-like flange 71 which horizontally extends in the front direction and in the rear direction from the bottom end of the sensing unit 72, a load input rod 73 which extends upward from the upper end of the sensing unit 72, and a connector 74 which extends from the sensing unit 72 to become horizontal with the flange 71. An elongated hole 75 which penetrates the flange 71 in an up-and-down direction and has a left-and-right direction as the longitudinal direction is formed on either front part or back part of the flange 71, and a notch 76 which has an opening at the edge along the longitudinal direction of the flange 71 and has a left-and-right direction as the longitudinal direction is formed on the other part. The notch 76 is formed on the flange 71 directly beneath the connector 74. A screw thread is formed on the periphery of the load input rod 73. Moreover, the sensing unit 72 incorporates a strain gauge, and the load is converted to an electrical signal by the strain gauge.

Figure 7:
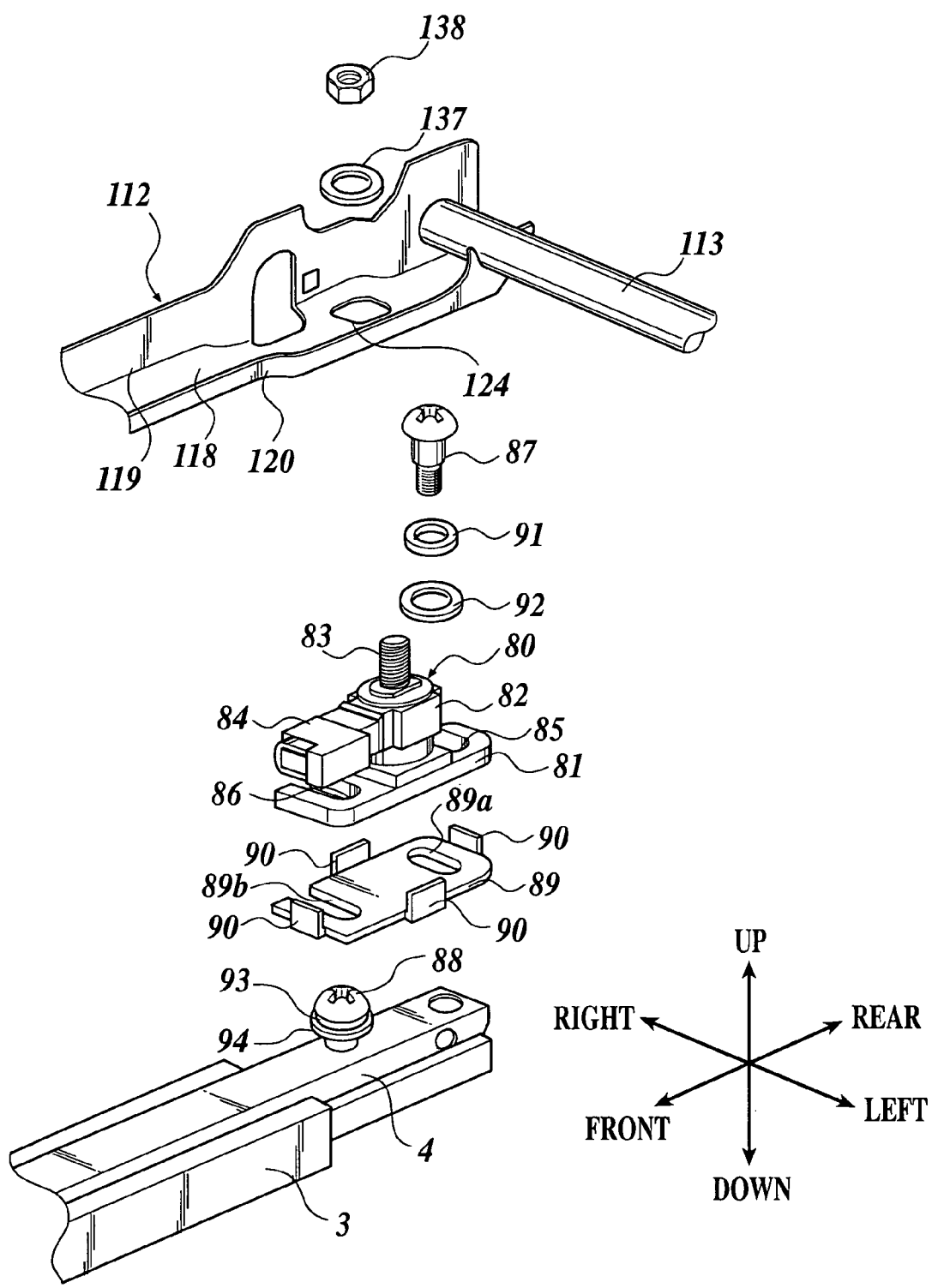
FIG. 7 This is an exploded perspective view showing an attachment structure of a load sensor 80.

FIG. 7 is an exploded perspective view showing a rear end of the movable upper rail 4. As shown in FIG. 7, similarly to the right front load sensor 70, the right rear load sensor 80 comprises a flange 81, a sensing unit 82, a load input rod 83, and a connector 84. References having the same last single digit are assigned to the corresponding parts of the right front load sensor 70 and the right rear load sensor 80, and the description of each part of the right rear load sensor 80 is omitted.

The right rear load sensor 80 is disposed on the rear end of the right movable upper rail 4 as shown in FIG. 7. A slide plate 89 having approximately the same shape as the planar shape of the flange 81 abuts the lower surface of the flange 81, and the flange 81 is grasped by four pawls 90 formed at the edge of the slide plate 89. On the slide plate 89, an elongated hole 89a which penetrates in an up-and-down direction and has a left-and-right direction as the longitudinal direction is formed. Further, a notch 89b which has an opening at the edge along the longitudinal direction of the slide plate 89 and has a left-and-right direction as the longitudinal direction is formed on the slide plate 89. The elongated hole 89a corresponds to the elongated hole 85 of the load sensor 80, and the notch 89b corresponds to the notch 86 of the load sensor 80.

The flange 81 is disposed on the upper surface of the movable upper rail 4 in a state where the slide plate 89 abuts the upper surface of the right movable upper rail 4. Further, the level screw 87 which is inserted into the ring-shaped damper 91 and the slide member 92 is inserted into the elongated hole 85 from above as a slider, and the level screw 87 is disposed so as to erect it with respect to the upper surface of the movable upper rail 4 by engaging the level screw 87 with the movable upper rail 4. The slide plate 89, the flange 81, the slide member 92, and the damper 91 are held between the head of the level screw 87 and the movable upper rail 4, and the level screw 87 can slide in the longitudinal direction of the elongated hole 85.

Further, the level screw 88 which is inserted into the ring-shaped damper 93 and the slide member 94 is engaged with the movable upper rail 4 so as to erect it on the upper surface of the movable upper rail 4, and the level screw 88 is inserted into the notch 86 as the slider. The slide plate 89, the flange 81, the slide member 94, and the damper 93 are held between the head of the level screw 88 and the movable upper rail 4, and the level screw 88 can slide in the longitudinal direction of the notch 86. In such way, the level screw 87 slides in the longitudinal direction of the elongated hole 85, and the level screw 88 slides in the longitudinal direction of the notch 86. Therefore, the right rear load sensor 80 can slide in a left-and-right direction with respect to the right movable upper rail 4 in the range between the point where the level screw 87 abuts the right end of the elongated hole 85 and the point where the level screw 87 abuts the left end of the elongated hole 85.

The mounting instruction for the right rear load sensor 80 is as described below. First, the level screw 88 is inserted into the damper 93 and the slide member 94, in this order, and the level screw 88 is engaged with the movable upper rail 4 so as to erect it on the upper surface of the movable upper rail 4. However, the head of the level screw 88 is to be apart from the upper surface of the movable upper rail 4. Next, the slide plate 89 is fitted to the flange 81 of the right rear load sensor 80, and the flange 81 is grasped by the pawls 90 of the slide plate 89. Then, the level screw 88 is inserted into the damper 91 and the slide member 92, in this order. Further, the level screw 87 is inserted into the elongated hole 85 and the level screw 87 is engaged with the movable upper rail 4. At this state, the level screw 88 is not in the notch 86. Next, by rotating the right rear load sensor 80 centering the level screw 87, the level screw 88 is inserted into the opening of the notch 86 at the edge of the flange 81 and the level screw 88 is latched by the notch 86. In such way, because the notch 86 is located directly beneath the connector 84, the connector 84 becomes an obstacle and the level screw 88 cannot be inserted into the notch 86 from above to be engaged with the movable upper rail 4. However, because the level screw 88 is engaged with the movable upper rail 4 beforehand and the notch 86 has an opening at the edge of the flange 81, the level screw 88 can be inserted into the notch 86 by the rotation of the load sensor 80. Moreover, because the flange 81 is held between the head of the level screw 88 and the movable upper rail 4, the load sensor 80 does not depart upward easily. In addition, because the flange 81 of the load sensor 80 is grasped by the pawls 90, the slide plate 89 does not slide with respect to the flange 81 when the load sensor 80 rotates.

The lower surface of the slide plate 89 is coated by a resin or the like so that the slide plate 89 is easily slid with respect to the movable upper rail 4. Instead of providing the coated slide plate 89, the flange 81 can be made to be easily slid with respect to the movable upper rail 4 by coating the lower surface of the flange 81 with a resin or the like.

As shown in FIG. 2, the right front load sensor 70 is mounted on the upper surface of the movable upper rail 4 in a similar way as the load sensor 80. The mounting instruction for the right front load sensor 70 is the same as the case of the right rear load sensor 80. That is, the slide plate 79 disposed in a same way as the slide plate 89 is grasped by the pawls to the lower surface of the flange 71, and the level screw 77 which is inserted into the damper 101 and the slide member 102 comes through the elongated hole 75 from above to be engaged with the movable upper rail 4 so as to erect it on the upper surface of the movable upper rail 4. The level screw 78 which is inserted into the damper 103 and the slide member 104 engages with the movable upper rail 4 so as to erect it on the upper surface on the movable upper rail 4, and the level screw 78 is inserted into the notch 76 by the rotation of the right front load sensor 70. Because the level screw 77 can slide in the longitudinal direction of the elongated hole 75 and the level screw 78 can slide in the longitudinal direction of the notch 76, the load sensor 70 can slide in a left-and-right direction with respect to the right movable upper rail 4 in the range between the point where the level screw 77 abuts the right end of the elongated hole 75 and the point where the level screw 77 abuts the left end of the elongated hole 75. Here, the tip of the connector 74 is directed backward for the right front load sensor 70, while the tip of the connector 84 is directed forward for the right rear load sensor 80.

As shown in FIG. 2, the rectangular frame 110 having a shape of a rectangle frame is mounted and fixed on the four load sensors 50, 60, 70, and 80. The rectangular frame 110 comprises a left patch member 111 which extends in a front-and-rear direction, a right patch member 112 which extends in a front-and-rear direction to become parallel with the patch member 111, a cross pipe 113 which crosses over between the rear ends of the patch members 111 and 112, and a front member 114 which crosses over between the front ends of the patch members 111 and 112.

The patch member 111 is a metal material having a web 115 and left and right flanges 116 and 117, and is U-shaped in section. The length of the web 115 in a front-and-rear direction is longer than the length of the flanges 116 and 117 in a front-and-rear direction, the front end of the web 115 projects more in front than the front ends of the flanges 116 and 117, and the web 115 is not provided at left and right of the front end of the web 115. The right patch member 112 is also a metal material having the web 118 and left and right flanges 119 and 120, and is U-shaped in section, and the webs 119 and 120 are not provided at left and right of the front end of the web 118. The mounting hole 121 is formed at the front end of the web 115 of the left patch member 111 to penetrate in an up-and-down direction, and the mounting hole 122 is formed at the rear end of the web 115 to penetrate in an up-and-down direction. The mounting hole 123 is formed at the front end of the web 118 of the right patch member 112 to penetrate in an up-and-down direction, and the mounting hole 124 is formed at the rear end of the web 118 to penetrate in an up-and-down direction.

The front member 114 is a metal material having the web and front and back flanges, and is U-shaped in section. The left end of the front member 114 is welded to the upper surface of the projected front end of the web 115, and the right end of the front member 114 is welded to the upper surface of the projected front end of the web 115. A harness which is connected to the connectors 54, 64, 74, and 84 of the load sensors 50, 60, 70, and 80 is applied to the front member 114 by clips.

The mounting hole is formed to penetrate in a left-and-right direction at the rear end of the flange 116 of the left patch member 111, the cross pipe 113 is inserted into this mounting hole, and further, the cross pipe 113 and the flange 116 are fixed by welding. The mounting hole which penetrates in a left-and-right direction is also formed at the rear end of the flange 119 of the right patch member 112, the cross pipe 113 is inserted in this mounting hole, and the cross pipe 113 and the flange 119 are fixed by welding.

The rectangular frame 110 which is assembled as described above is disposed to the load sensor 50, 60, 70, and 80 as described below. The load input rod 53 of the left front load sensor 50 is inserted into the mounting hole 121 of the left patch member 111 from bottom up, and the front end of the left patch member 111 is mounted on the sensing unit 52. Then, the washer 131 is provided around the load input rod 53 as a ring, the nut 132 engages with the load input rod 53, the washer 131 and the web 115 are held between the nut 132 and the upper surface of the sensing unit 52, and the load input rod 53 is fixed to the front end of the left patch member 111 by the tightening of the nut 132. Similarly, the load input rod 73 is inserted into the mounting hole 123 and the washer 135 from bottom, and the rear end of the right patch member 112 is mounted on the sensing unit 72. The load input rod 73 is fixed to the front end of the right patch member 112 by the tightening of the nut 136 which is engaged with the load input rod 73.

Similarly for the rear load sensors 60 and 80, by the tightening of the nuts 134 and 138 which are engaged with the load input rods 63 and 83 that are inserted into the mounting holes 122 and 124 and the washer 133 and 137 from bottom, the load input rods 63 and 83 are fixed to the rear end of the patch members 111 and 112.

Here, because the right load sensors 70 and 80 are disposed to be slidable in a left-and-right direction with respect to the right movable upper rail 4, each of the mounting holes 121 to 124 can be fitted to the load input rods 53, 63, 73, and 83, respectively, with minor adjustments of the load sensors 70 and 80 in a left-and-right direction. Therefore, when the rectangular frame 110 is disposed, the initial deformation of the rectangular frame 110 and the like can be prevented, and the initial load to the load sensor 50, 60, 70, and 80 can be eliminated.

The rectangular frame 110 is assembled by welding in advance before disposing to the load sensor 50, 60, 70, and 80. However, when the rectangular frame 110 is assembled, the patch member 111, the patch member 112, the cross pipe 113, and the front member 114 are fixed by the jig so that each of the mounting holes 121 to 124 can fit to the load input rods 53, 63, 73, and 83, respectively. Therefore, each of the load input rods 53, 63, 73, and 83 can be fit to and inserted into the mounting holes 121 to 124, respectively, without deforming the pre-assembled rectangular frame 110. Thus, the initial load and the initial deformation occurring to the rectangle frame 110, the lower bracket 5, the lower rail 3, the upper rail 4, and the like can be prevented.

In a state where the rectangular frame 110 is disposed on the load sensors 50, 60, 70, and 80, when seen from above as a plan view, the front member 114 is positioned more in front than the submarine pipe 11.

As shown in FIG. 1, the side frame 141 is welded to the flange 116 outside of the patch member 111, and the side frame 142 is welded to the flange 119 outside of the patch member 112. The side frames 141 and 142 are parts of the seat cushion frame, and particularly, constitute the sides of the seat cushion frame. Further, the rectangular frame 110 reinforces the side frames 142 and 142 as a part of the frame of the seat cushion. Before disposing the rectangular frame 110 on the load sensors 50, 60, 70, and 80, the side frames 141 and 142 are disposed to the rectangular frame 110 by welding.

The front of the side frames 141 and 142 are covered with the pan frame 143 from the above, and the pan frame 143 is tightened with respect to the side frames 141 and 142 by the bolt 144 as a male screw. Further, the pan frame 143 can be dismounted by loosening and removing the bolt 144. Here, the pan frame 143 is a part of the seat cushion, and particularly, constitutes the front of the seat cushion frame. The pan frame 143 may be tightened to the side frames 141 and 142 by other male screws instead of the bolt 144. The pan frame 143 may be fixed to the side frames 141 and 142 by latching the locking unit formed on the pan frame 143 with the locking unit formed on the side frames 141 and 142, and the pan frame 143 may be detached from the side frames 141 and 142 by elastically deforming both of the locking units.

The seat spring 145 is crossed over between the cross pipe 113 and the pan frame 143. A cushion is mounted on the pan frame 143 and the seat spring 145. The cushion, the pan frame 143, and the side frames 141 and 142 are covered with a cover entirely.

In the passenger's weight measurement device 1 configured as described above, when a passenger sits on the seat cushion, the weight (body weight) of the passenger is applied to the load sensors 50, 60, 70, and 80 through the rectangular frame 110, and the weight of the passenger is converted to an electrical signal by the load sensor 50, 60, 70, and 80.

Here, each one of the load sensors 50, 60, 70, and 80 is disposed between the movable upper rail 4 and the side frames 141 and 142 so as to attach one sensor in the front and one sensor in the rear. The load sensors 50, 60, 70, and 80 are configured to move in a front-and-rear direction as a unit with the vehicle seat. Therefore, despite the position of the vehicle seat in a front-and-rear direction, the load (weight of a passenger) transmitted to the load sensors 50, 60, 70, and 80 from the vehicle seat can be consistently kept constant. Thus, the accuracy of the passenger's weight measurement can improve.

Further, the right load sensors 70 and 80 can slide in a left-and-right direction with respect to the movable upper rail 4. Therefore, even when the load is applied in a left-and-right direction with respect to the rectangular frame 110 and the like, the load escapes due to the sliding of the load sensors 70 and 80 and the load in a left-and-right direction is not applied to the load sensors 50, 60, 70, and 80. Thus, the accuracy of the passenger's weight measurement can be improved.

While to the right load sensors 70 and 80 can slide with respect to the right movable upper rail 4, the left load sensors 50 and 60 are fixed to the left movable upper rail 4. Therefore, the entire vehicle seat does not sway in a left-and-right direction and the minimum rigidity as a vehicle seat is assured.

Moreover, because the submarine pipe 11 is located more in rear than the front member 114, when a frontward inertia force is applied to the passenger due to a front collision or the like of the vehicle, the buttocks of the passenger seated on the vehicle seat are held by the submarine pipe 11. Therefore, so-called submarine phenomenon where the passenger gets under the waist belt can be prevented.

Further, because the submarine pipe 11 is provided separately from the front member 114, the buttocks of the passenger do not hit against the front member 114 at the time of front collision or the like of the vehicle. Therefore, the forward inertia force at the time of front collision or the like of the vehicle is not transmitted to the load sensors 50, 60, 70, and 80 through the rectangular frame 110. Thus, the accuracy of the passenger's weight measurement can be improved even at the time of front collision or the like of the vehicle.

Moreover, because the buttocks of the passenger are held by the submarine pipe 11 at the time of front collision or the like of the vehicle, there is a case where the submarine pipe bends forward in convex. Here, because the right end of the submarine pipe 11 can move in a left-and-right direction with respect to the bracket 9 and is not fixed to the bracket 9, the load is not transmitted to the load sensors 50, 60, 70, and 80 even when the forward load is applied to the submarine pipe 11. Thus, the accuracy of the passenger's weight measurement can be improved even at the time of front collision or the like of the vehicle.

Further, because the rectangular frame 110 is assembled beforehand, each of the load input rods 53, 63, 73, and 83 can be matched and inserted into the mounting holes 121 to 124, respectively, without deforming the assembled rectangular frame 110. Therefore, application of the initial load to the load sensors 50, 60, 70, and 80 can be prevented when the load is not applied to the rectangular frame 110. Thus, the accuracy of the passenger's weight measurement can be improved.

Further, only the webs 115 and 118 are provided at the front end of the patch members 111 and 112, and the flanges 116, 117, 119, and 120 are not provided there. Therefore, because the patch members 111 and 112 are deformed at the front end of the webs 115 and 118 thereof when a large load is applied to the rectangular frames 110 at the time of front collision or the like of the vehicle, the load is alleviated at the deformed portion. Therefore, a large load is not transmitted to the load sensors 50, 60, 70, and 80 even when a large load is applied to the rectangular frame 110. Thus, the accuracy of the passenger's weight measurement can be improved and the damage to the load sensors 50, 60, 70, and 80 can be suppressed even at the time of front collision or the like of the vehicle.

In addition, because the top of the front load sensors 50 and 70 are opened when the pan frame 143 is dismounted, the maintenance of the load sensors 50 and 70 can be done.

Further, the present invention is not limited to the embodiment described above. Various improvements and design changes can be made without departing from the gist of the invention.

Modification Example 1

In the above described embodiment, the right load sensors 70 and 80 are disposed to be slidable in a left-and-right direction with respect to the movable upper rail 4. However, the right load sensor 70 and 80 may further be disposed to be slidable in a left-and-right direction with respect to the patch member 112. Moreover, the load sensors 70 and 80 may be fixed to the movable upper rail 4 and may be disposed to be slidable in a left-and-right direction with respect to the patch member 112. Here, in order to dispose the load sensors 70 and 80 to be slidable in a left-and-right direction with respect to the patch member 112, the mounting holes 123 and 124 are formed as elongated holes lengthened in a left-and-right direction, the load input rods 73 and 83 are inserted into the ring-shaped slide member, and the slide member is held between the washers 135 and 137 and the web 118. In addition, in order to fix the load sensors 70 and 80 to the movable upper rail 4, the load sensors 70 and 80 are fixed to the movable upper rail 4 in a similar way as the left load sensors 50 and 60.

Modification Example 2

In the above described embodiment, the passenger's weight measurement device 1 is mounted on the right vehicle seat. However, the passenger's weight measurement device 1 may be mounted on the left vehicle seat. The passenger's weight measurement device 1 for the left vehicle seat is structured in symmetrical with respect to the passenger's weight measurement device 1 described in the above embodiment. That is, in the passenger's weight measurement device 1 for the left vehicle seat, the load sensors 70 and 80 which can slide in a left-and-right direction are on the left side and the fixed load sensors 50 and 60 are on the right side.

Modification Example 3

In the above described embodiment, the flanges 71 and 81 of the load sensors 70 and 80 horizontally extend in a front-and-rear direction. However, the flanges 71 and 81 of the load sensor 70 and 80 may horizontally extend in a left-and-right direction. The longitudinal direction of the elongated holes 75 and 85 and the notches 76 and 86 formed on the flanges 71 and 81 is the left-and-right direction even when the flanges 71 and 81 extend in a left-and-right direction. The width of the movable upper rail 4 in a left-and-right direction can be narrower when the flanges 71 and 81 extend in a front-and-rear direction, as described in the above embodiment, as compared with the case where the flanges 71 and 81 extend in a left-and-right direction.

INDUSTRIAL APPLICABILITY

The passenger's weight measurement device can be applied widely to, for example, car, train, and other vehicle seats.

The invention claimed is:

1. A passenger weight measurement device for a vehicle seat, the device comprising:
   right and left fixed rails fixed on a vehicle side;
   right and left movable rails provided on the right and left fixed rails, respectively, and disposed so as to be movable in a front-and-rear direction on the right and left fixed rails, respectively;
   right and left load sensors mounted above the right and left movable rails, and
   a position adjusting portion for adjusting an attachment position of one load sensor of the right and left load sensors so as to be movable with respect to the movable rail,
   wherein a fixed attachment position of the other load sensor is set as a reference position.

2. The passenger weight measurement device as claimed in claim 1, wherein a first hole is provided in an attachment portion of the other load sensor and a second hole is provided as the position adjusting portion of the one load sensor, and the second hole is longer in a right-and-left direction than the first hole.

3. The passenger weight measurement device as claimed in claim 1, wherein a first hole is provided in an attachment portion of the other load sensor and a second hole is provided as the position adjusting portion of the one load sensor, and the first hole has a circular shape and the second hole has an elongated shape.

4. The passenger weight measurement device as claimed in claim 1, wherein the other load sensor is mounted at least on a front side of one movable rail of the right and left movable rails, and the position adjusting portion is provided at least on a front side of the other movable rail of the right and left movable rails, and
   wherein the front side of the one movable rail and the front side of the other movable rail are connected by a first connecting member.

5. The passenger weight measurement device as claimed in claim 4, wherein the first connecting member is provided at least on one end side of each of the right and left load sensors.

6. The passenger weight measurement device as claimed in claim 4, wherein the first connecting member is provided above the right and left load sensors.

7. The passenger weight measurement device as claimed in claim 1, wherein the other load sensor is mounted at least on a rear side of one movable rail of the right and left movable rails, and the position adjusting portion is provided at least on a rear side of the other movable rail of the right and left movable rails, and
   wherein the rear side of the one movable rail and the rear side of the other movable rail are connected by a second connecting member.

8. The passenger weight measurement device as claimed in claim 7, wherein the second connecting member is provided at least on one end side of each of the right and left load sensors.

9. The passenger weight measurement device as claimed in claim 7, wherein the second connecting member is provided above the right and left load sensors.

10. The passenger weight measurement device as claimed in claim 1, wherein the other load sensor includes at least two load sensors mounted at least on a front side and a rear side of one movable rail of the right and left movable rails, and the position adjusting portion includes at least two position adjusting portions provided at least on a front side and a rear side of the other movable rail of the right and left movable rails, and
    wherein the front side of the one movable rail and the front side of the other movable rail are connected by a first connecting member, and the rear side of the one movable rail and the rear side of the other movable rail are connected by a second connecting member.

11. The passenger weight measurement device as claimed in claim 10, wherein a right rail member comprises the right fixed rail and the right movable rail and a left rail member comprises the left fixed rail and the left movable rail, and
    wherein middle portions of the right and left rail members are connected by a third connecting member.

12. The passenger weight measurement device as claimed in claim 11, wherein the third connecting member is wider in the front-and-rear direction than the first connecting member and the second connecting member.

13. The passenger weight measurement device as claimed in claim 1, wherein a load sensor attachment member provided between one of the right and left movable rails and one of the right and left load sensors is attached to an upper surface of the one of the right and left movable rails.

14. The passenger weight measurement device as claimed in claim 13, wherein in the load sensor attachment member, at least one projecting wall projecting upwardly is formed in a peripheral portion of the one of the right and left load sensors.

15. The passenger weight measurement device as claimed in claim 14, wherein the projecting walls are provided in front of the one of the right and left load sensors and behind the one of the right and left load sensors.

16. The passenger weight measurement device as claimed in claim 15, wherein at least one of the projecting walls projects toward a connector provided in the one of the right and left load sensors.

17. The passenger weight measurement device as claimed in claim 1, wherein a first load sensor attachment member is provided between one of the right and left movable rails and the load sensor is mounted on a front side of the one of the right and left movable rails,
    a second load sensor attachment member is provided between the one of the right and left movable rails and the load sensor mounted on a rear side of the one of the right and left movable rails, and the first load sensor attachment member and the second load sensor attachment member are attached to the one of the right and left movable rails.

18. The passenger weight measurement device as claimed in claim 1, wherein each of the load sensors is mounted on the movable rails via a ring-shaped damper member.

19. A passenger weight measurement device for a vehicle seat, the device comprising:
right and left fixed rails fixed on a vehicle side;
right and left movable rails provided on the right and left fixed rails, respectively, and disposed so as to be movable in a front-and-rear direction on the right and left fixed rails, respectively; and
right and left load sensors mounted above the right and left movable rails,
wherein one load sensor of the right and left load sensors is mounted on one movable rail of the right and left movable rails so as to be fixed to the one movable rail, and
the other load sensor of the right and left load sensors is mounted on the other movable rail of the right and left movable rails so as to be movable in a right-and-left direction with respect to the other movable rail.

20. The passenger weight measurement device as claimed in claim 19, wherein the other load sensor is movable in the right-and-left direction by a first hole provided in an attachment portion of the other load sensor, the first hole being longer in the right-and-left direction than a second hole provided in an attachment portion of the one load sensor.

21. The passenger weight measurement device as claimed in claim 19, further comprising a rectangular frame which is disposed above the right and left movable rails and in which a plurality of mounting holes corresponding to the load sensors are formed to penetrate in an up and down direction,
wherein the rectangular frame in which rods of the load sensors are inserted into the plurality of mounting holes from bottom up, is mounted on the load sensors.

22. A passenger weight measurement device for a vehicle seat, the device comprising:
right and left fixed rails fixed on a vehicle side;
right and left movable rails provided on the right and left fixed rails, respectively, and disposed so as to be movable in a front-and-rear direction on the right and left fixed rails, respectively; and
right and left front load sensors and right and left rear load sensors mounted above the right and left movable rails, respectively, the right and left front load sensors being mounted on a front side of the right movable rail and a front side of the left movable rail, respectively, and the right and left rear load sensors being mounted on a rear side of the right movable rail and a rear side of the left movable rail, respectively,
wherein first holes provided in attachment portions of one set of load sensors of the right and left load sensors and second holes provided in attachment portions of another set of load sensors of the right and left load sensors are provided, and the second holes are longer in the right-and-left direction than the first holes.

23. The passenger weight measurement device as claimed in claim 22, wherein the front side of one movable rail of the right and left movable rails and the front side of the other movable rail of the right and left movable rails are connected by a first connecting member, and the rear side of the one movable rail and the rear side of the other movable rail are connected by a second connecting member,
wherein a right rail member comprises the right fixed rail and the right movable rail and a left rail member comprises the left fixed rail and the left movable rail, and
wherein middle portions of the right and left rail members are connected by a third connecting member.

24. The passenger weight measurement device as claimed in claim 22, wherein right and left front load sensor attachment members provided above the right and left front load sensors are connected, right and left rear load sensor attachment members provided above the right and left rear load sensors are connected, and a cushion-side side frame is attached to an outer surface of the right and left front load sensor attachment members and an outer surface of the right and left rear load sensor attachment members.

* * * * *